March 26, 1940.  E. W. BACKERT  2,195,070
PAPERBOARD BASKET
Filed Aug. 25, 1937  2 Sheets-Sheet 1
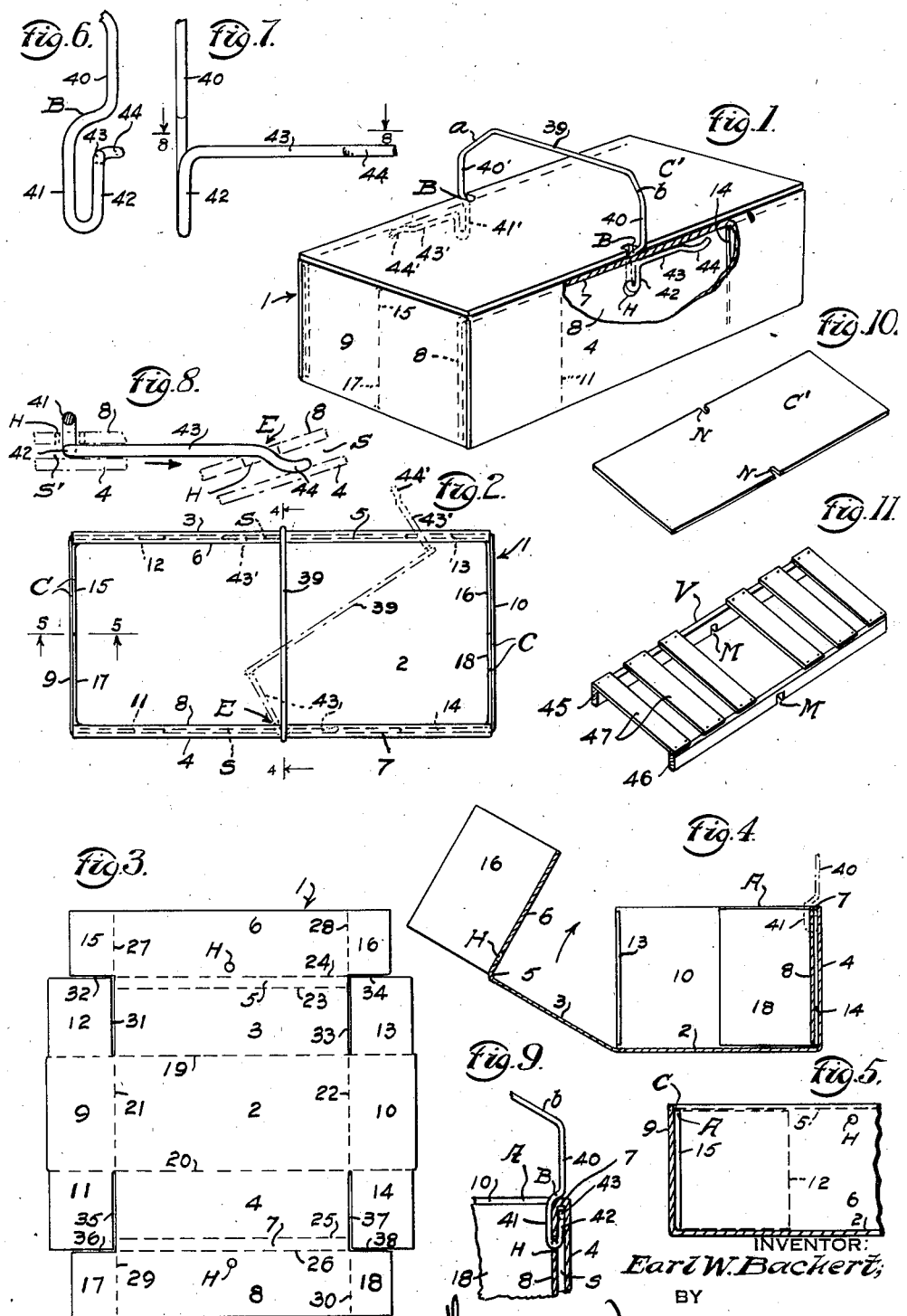
INVENTOR:
Earl W. Backert;
BY
Harold D. Penney
ATTORNEY,

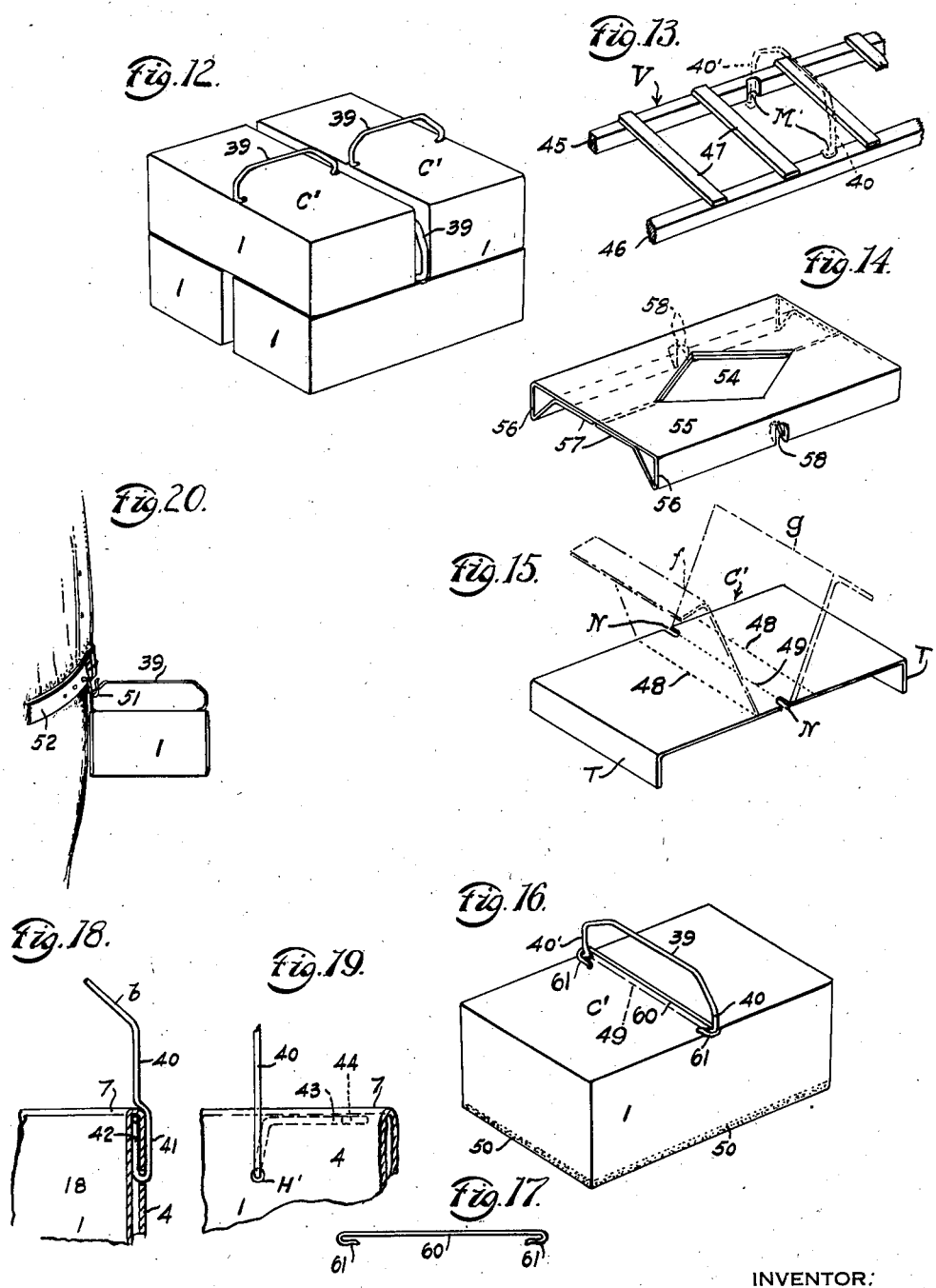

Patented Mar. 26, 1940

2,195,070

UNITED STATES PATENT OFFICE 2,195,070

PAPERBOARD BASKET

Earl W. Backert, Cleveland, Ohio, assignor to Robert Gair Company, Inc., New York, N. Y., a corporation of Delaware Application August 25, 1937, Serial No. 160,754

20 Claims. (Cl. 229—34)

The present invention relates to baskets or like containers preferably made of paperboard.

The improved structure shown herein provides for a novel container made from a single blank, which, when erected, will have double side and end walls, with a single bottom. The side walls are scored and doubled in such a manner as to create broad top edges and to space the side wall and its inner extension apart, for reasons later to be noted in detail.

A further advantage in the present basket structure is in the provision of a removable and replaceable handle thereon of novel form, which is provided with means for interlocking with co-acting parts of the basket whereby to prevent accidental release from its operative handle position and to distribute the weight of the basket over a greater edge handle contact area, to prevent pulling or cutting through of the handle, and to stabilize the handle against loose movement when in operative position in the basket.

The essential feature of the present construction, is that the basket blanks may be shipped knockdown, in bundles and in flat condition to the grower, with the handles in separate bundles, and the baskets are then manually assembled, as required, without the use of machinery and which baskets after assembly, are frictionally held in rigid, operative condition, without the use of staples, stitching or adhesives.

While the present basket is adapted to be made of paperboard of any kind, it is, preferably, made of double-faced corrugated paperboard.

A further advantage in the present improvement lies in the provision of means whereby the herein described baskets may be assembled, and without the cover, be used by the fruit or vegetable picker to carry the picked fruits from the field to the sorting and packing sheds, and to this end, an open slat cover, preferably made from wooden strips, is provided as a temporary closure, whereby the picker may overfill the basket with such vegetables or fruit and then place the slat cover upon the overfilled basket, thereby to retain the over-surplus of vegetables in the basket without spilling until the basket reaches the sorting and packing sheds where it may be emptied, the vegetables inspected, sorted and carefully packed flush to the rim of the basket and a paperboard shipping cover placed upon the basket to finally close the basket and contents for shipment to and sale in the markets.

The foregoing and other features of improvement will be apprehended as the herein noted description proceeds, and it will be obvious that modifications may be made in the structure herein disclosed, without departing from the spirit hereof or the scope of the appended claims.

In the drawings:

Fig. 1 is a perspective view of the present container showing it as packed for the market, with parts broken away to better show details thereof;

Fig. 2 is a plan view of Fig. 1 with the cover omitted;

Fig. 3 is a stretchout of the single blank utilized in forming the basket structure of Figs. 1 and 2;

Fig. 4 is a transverse sectional view taken on line 4—4, Fig. 2, looking in the direction of the arrows;

Fig. 5 is a fragmental sectional view taken on line 5—5, Fig. 2;

Figs. 6 and 7 are enlarged, fragmentary end and transverse views of the wire handle at one end thereof;

Fig. 8 is an enlarged, fragmentary view of the container-engaging hook end of the handle, showing certain positions of the hook and its relative position to the container sides, shown fragmentary and dotted, during and after the insertion of the hook into operative position on the container;

Fig. 9 is an enlarged fragmentary sectional view of the container taken on the upper right-hand corner of the container, as viewed in Fig. 4;

Fig. 10 is a perspective view of the shipping cover for the container;

Fig. 11 is a perspective view of the slatted, temporary field cover;

Fig. 12 is a perspective view showing the manner of stacking the filled baskets for transportation;

Fig. 13 is a fragmented, perspective view of a slightly modified form of temporary field cover;

Fig. 14 is a perspective view of a further modified form of cover, for use in shipping fruit;

Fig. 15 is a perspective view of a modified shipping cover;

Fig. 16 is a perspective view of a shipping basket with a modified shipping closure or cover thereon;

Fig. 17 is a view of the shipping cover locking hook;

Fig. 18 is a fragmentary section of one of the basket sides showing a modified manner of mounting the wire handle;

Fig. 19 is a fragmentary side view of Fig. 18; and

Fig. 20 discloses the manner in which the basket is carried by the picker in the field.

The container and its blank generally denoted by 1, as disclosed in Fig. 3, comprises a single blank of, preferably, double-faced corrugated board, and comprises a bottom-forming panel 2, which has oppositely extending outside side wall forming panels 3 and 4 defined therefrom by common score lines 19 and 20, respectively. The bottom panel 2 has two oppositely extending outer end wall forming panels 9 and 10 defined therefrom by score lines 21 and 22 respectively. Score lines 19—20 and 21—22 are at right-angles to one another thus defining bottom-forming panel 2 as an elongate rectangle.

Outside end-forming panel 9 carries two panel locking flap extensions 11 and 12, these being defined from panel 9, by the common score lines 19 and 20. End-forming panel 10 carries two panel-locking flap extensions 13 and 14, these being defined from panel 10, by the common score lines 19 and 20, respectively.

Outside side-forming panel 3 carries an inside extending side-forming panel 6, defined therefrom by a double parallel score line 23—24, leaving a narrow top edge spacing section 5 between panels 3 and 6. Likewise, opposite outer side-forming panel 4 carries an inside extending side forming panel 8, which is defined from panel 4, by double parallel score lines 25—26, leaving a narrow, top edge forming and spacing section 7 between panels 4 and 8.

Inside side-forming panel 6 carries two inside end forming flap extensions 15 and 16, which are defined therefrom by score lines 27—28, respectively.

Opposite inside side forming panel 8 is likewise provided with two inside end forming flap extensions 17—18 defined therefrom by score lines 29 and 30, respectively.

Lock flap extension 11 of side panel 9 is defined from adjacent associate container-forming parts such as panel 4 and inside end locking flap 17 by cut scores 35 and 36 respectively. Oppositely located inside lock flap extension 12 is defined from its associate container-forming members such as panel 3 and extending inside flap 15 by cut score lines 31—32 respectively. Inside lock flap extension 13 is defined from its associate container-forming parts such as panel 3 and inside end forming extension 16, by cut scores 33 and 34, respectively. Lock flap extension 14 is defined from its associate container-forming parts such as panel 4 and inside end forming flap extension 18, by cut scores 37 and 38, respectively.

The inside side forming panels 6 and 8 are provided with handle hook receiving apertures H and H, respectively, which are so located that when the blank is erected into container-forming assembly, the said apertures are located, as indicated in Fig. 2 at the middle of the elongate length of the side panels, and a short distance from the top edge of the side-forming panels 3—6 and 4—8.

The foregoing describes the box blank in its entirety, and it will be noted that the blank layout, as shown in Fig. 3 is substantially rectangular in outline thus eliminating waste of material.

In forming the carton blank into a container, the end-forming panels 9 and 10 are first bent up on the score lines 21 and 22 and the locking flap extensions 11—12 and 13—14 are bent inwardly on their common score lines 19 and 20.

Then the panel 3 may be bent up on its common score line 19, panel 3 coming in contact with lock extensions 12—13, then with the inside closing end extensions 15 and 16 folded backwardly, on their score lines, as disclosed in Fig. 4, the panel 3 is moved in the direction of the associate arrow in Fig. 4, and inside forming panel 6 is folded down into the container, breaking the double score lines 23—24, and causing the narrow strip 5 to become a flat top edge 5, Fig. 2, where the final assembly of the panels 3 and 6, and their associate flap extensions are shown in ordered arrangement.

The assembly of panels 4 and 8 is accomplished in the same manner as described for the foregoing; panel 4 is bent on its common score line 20, being overfolded on lock flap extensions 11 and 14, see Fig. 2, and with the flap extensions 17—18 back-folded, inside-side forming flap 8 is pushed down into the interior of the container, until it occupies the position shown in Fig. 4, leaving narrow strip 7 to form a square top edge 7, Figs. 2 and 4.

After the assembly of the container, as viewed in Figs. 1 and 2, panels 6 and 8 form inside container walls, extensions 15, 16, 17 and 18 form inside end walls, panels 3 and 4, and 9 and 10, form outside side and end walls respectively, the latter end walls and their inside flap extensions having exposed cut top edges C. The top edges of outer end flap panels, as may be seen in Figs. 5 and 9 are extended upwardly beyond the edges of the inside end forming flaps 15, 16, 17 and 18 thereby to form a recessed seat A, in which to seat the opposite ends of the shipping cover C'.

As thus described, and shown, it will be seen that the lock flaps 12 and 13 are embraced between the walls of side panels 3 and 6, and the lock flaps 11 and 14 are embraced between the side flaps 4 and 8, and this in turn locks the end panels 9 and 10 and the entire assembly in firm, erected position.

After the erection of the blank into a container, it is ready for reception of the handle which is made of bent wire.

The handle comprises two side uprights 40—40 joined by an integral cross-wire handle portion 39.

As viewed in Figs. 6 and 9 the uprights 40 are inset inwardly at their inner ends as at 41, are then bent around and upwardly to form a hook end 42, and then the hook end extension as at 43, Fig. 7, is bent at right-angles, in the same plane as the upper end of hook 42, to form a right-angled, offset container edge embracing support, which engages the under, inner, face of the square edge 7, Figs. 1, 2 and 9 in the spaces. The outer end of offset edge embracing support 43 as will be seen in Fig. 8, is offset in a curve, the offset, entrant end 44, enabling the insertion of said end into the aperture H on inside panel 8, shown dotted in Fig. 8, and after such insertion the right-angled hook end 43 is pushed along the face of panel 8, in the direction of the associate arrow, until the hook portion 41 finally reaches the aperture H, where it is then pulled upwardly until the lower looped part of the hook portions 41—42 embrace panel 8 on both faces, shown dotted, Fig. 8, at left-hand side, and the edge embracing support 43 firmly engages the under-face of square edge 7, Fig. 1.

The opposite end of the wire handle is constructed as described above for the structure 40, 41, 42, 43 and 44, with the exception, as will be noted, that the corresponding parts 41', 42', 43' and 44' are reversed, so that the two cammed hook ends 44 and 44' may be simultaneously engaged in the opposite apertures H, from the dotted position shown in Fig. 2, and simultaneously engaged to the container or the ends 44 and 44' may be separately engaged by springing the wire hook ends, to gain advantageous aperture entrance position.

Due to the offset condition of the hook ends 41 and 42 from the upright 40, and as disclosed in Fig. 9, the angular joining portions B of the handle, between the handle upright portions 40 and 40', to join the hook portions 41 and 41', rest upon and above the inside edges of square topped edge strips 5 and 7, and thus form keys B, Figs. 1, 6 and 9.

The shipping cover C' is a flat piece of corrugated board, and is provided with notches N and N, Fig. 10, which notches, when the cover C' is in operative position and pushed down into its seat ends A—A, register with the key portions B—B and the uprights 40—40' of the handle and the cover is effectively held in operative closed position, as in Fig. 1. In removing the cover C' one side is lifted to first clear one notch N; and then moved sidewise to disengage the other notch N and then the complete cover is slid endwise in either direction to remove it. Opposite procedure permits its ready, locked replacement.

In use as a picking basket, the container is carried by the picker in the field, and in the case of picking tomatoes, the basket is random filled to above its top edge, and when filled by the picker, the slat cover of Fig. 11 is then placed on the basket to prevent the overfilled basket from losing its contents, until the contents of the basket have been afterwards inspected, to be repacked, normally, flush with the top edge of the container.

The slat cover V, Fig. 11 comprises two spaced side rails 45—46, joined by a series of cross slats 47, the rails having cut therein at their lower mid-portions each a key notch M, which notches, when the slat cover is set on the basket top engage the key portions B of the handle uprights 40'—40.

Both the field cover V and the shipping cover C' are so key mounted that they do not come loose, easily, and the shipping cover permits of easy sales inspection when required. This inspection may be accomplished in two ways, one as already described by sliding the cover C' from the container after freeing the notches N—N from the handle engagement and the other, as illustrated in Fig. 15, where the cover C' is shown as being provided with either a single, centrally traversing scored hinge line 49 Figs. 15 and 16, which joins the notches N—N, or may be provided with two spaced-apart, scored hinge lines 48—48, whereby either end of the cover may be bent and lifted on one or the other of said scored hinges 48—48, or on the single scored hinge line 49, to inspect the goods, as shown dotted at f and g, Fig. 15. The cover C' of Fig. 15 is shown as being provided with two downwardly depending scored tuck flaps T—T, one at each end, so that where a hinged inspection cover is used, the cover may be frictionally reclosed by tucking the flaps T—T into the basket ends. Without these tuck flaps, the cover ends, when broken on either of the hinge means for inspection, tend to gap away from the basket top.

The exposed underface of the bottom panel 2, may be coated with a suitable water proof coating, as desired, so that in instances where the field being picked is wet, the bottom will be protected against softening by moisture, if the picker sets the basket on the ground, during picking operations. This waterproofing may be extended up around the bottom edges of the outer side walls, as illustrated in Fig. 16, by the stippling 50.

It will be noted, in Figs. 1, 2, 6 and 9, that the handle uprights 40 and 40' are offset widthwise, so that these uprights are in substantially vertical alinement with the outer side forming panels 3 and 4. This construction, with the angled portions a—b, Figs. 1, 9 and 20, and permits the picker to attach the handle to a hook 51, or its equivalent, which is attached to the belt 52 of the picker and thus hold the basket horizontally relative to the belt, and to leave both hands of the picker free, as illustrated in Fig. 20. The angular connections a—b, between the uprights and 40 and 40' and cross piece 39 may be rounded, or curved, instead of angled.

In Fig. 14 is disclosed an alternative form of shipping cover, to serve the same purpose as the covers shown in Figs. 1 and 12, but in the present instance, the cover of Fig. 14 is made up of a single blank of corrugated paperboard, which may be provided with a ventilating opening 54, and is scored and folded to provide a top panel 55, two triangular, downstanding reinforced side edges 56—56, and two reinforcing under flaps 57—57, which latter may be glued or otherwise attached to the under face of panel 55 to reinforce and hold the cover assembly together. The side edges 56—56 are each provided with centrally located undercut grooves 58—58 cut therein whereby they may be mounted between the handle uprights 40—40', as described for the cover C', and may be keyed thereto. This cover may be used on shipping baskets, containing an over-fill of apples, for shipment.

The slatted field cover shown in Fig. 13 is similar to the one shown in Fig. 11, with the exception that the side bars 45 and 46 are spaced wider apart and two vertical grooves M' are cut on the inside faces of said bars to permit pushing the slatted field cover down over the handle as shown by the dotted handle outline 40 and 40'.

While the wire handle may be inserted as shown in and described for Figs. 1, 2, 6, 7, 8 and 9, through holes H located interiorly of the basket, it is also possible to provide handle-engaging holes in different locations to obtain the same advantages. By reversing the cammed hook ends and putting the holes on the outside side walls, as at H', Figs. 18 and 19, the handle may be easily affixed to the outer side panels of the basket. Similarly the handle-engaging holes may be located on the top square edges 7 of the basket.

In many instances it is desirable to positively fasten the shipping cover C' to the shipping basket, such positive fastening means being easily applied and removed as desired, and to this end there is provided a wire cover-locking strut, or cross piece 60, Fig. 17, which may be provided with two hooked ends 61—61.

In applying the cover lock, as illustrated in Fig. 16, the cover C' is placed on the basket, as previously described, and then one hook end 61 is hooked around one upright 40' of the handle, and by springing the uprights 40 and 40' together, the other hooked end 61 is hooked around the other upright 40. The hook is then pressed down upon the cover C', and in this position, the cover C' is firmly held in closed position upon the basket, and can act as a positive stop, by means of which the hinged cover of Fig. 15, may be lifted at either end for inspection, as previously described, without disturbing the lock. Thus the locking cross strut has three functions, one, to lock the cover C' in operative covering position, another to act as a fulcrum against which the scored hinges may be broken for inspection and finally to prevent the gapping of the opposite sides of the basket.

The offset cammed outer hook ends 44 and 44' of the handle extensions, Figs. 1 and 2, enable these ends to be readily inserted into the apertures H—H, when assembling the handles in their operative position to the basket side panels.

What is claimed is:

1. A paperboard container erected without stitching or glue comprising a bottom, opposing outer side walls on said bottom, opposing inner side walls joined to said outer side walls at the upper edges thereof and forming, at the joining thereof, a substantially square upper edge therebetween, said outer and inner side members being spaced apart by said upper edge, outer and inner end members on said container, the outer end members being integral with said bottom and having end flaps thereon which are locked between the spaced side-forming members, and inner end-forming members integrally connected to said inner side-forming members, the upper edges of said inner end-forming members being lower than the edges of said outer end-forming members thereby to form joint recessed cover-receiving edges at the ends of said container.

2. A paperboard container comprising a bottom, opposing outer side walls on said bottom, opposing inner side walls joined to said outer side walls at the upper edges thereof and forming, at the joining thereof, an integral, square upper edge therebetween, said outer and inner side members being spaced apart by said integral edge, outer and inner end members on said container, the outer end members being integral with said bottom and having locked end flaps thereon which are locked between the spaced side-forming members, said inner end-forming members being integrally connected to said inner side-forming members, the upper edges of said inner end-forming members being lower than the edges of said outer end-forming members thereby to form joint recessed, cover-receiving edges at the ends of said container and a removable handle connected to said side-forming members.

3. In a container as set forth in claim 2, in which the handle is made of a single piece of bent wire, and comprises a cross wire handle-forming portion having two opposed upright sides, the ends of the sides being bent inwardly towards each other end being formed into container side wall gripping looped hooks, said hooks being in substantial alinement with said uprights and faced upwardly, the outer ends of the hooks being horizontally extended offset and at opposed right-angles to each other and the looped hooks and having their terminals formed into cam-shaped offsets as and for the purpose described.

4. A container as set forth in claim 2, in which the inner side forming panels are perforated to receive a handle and in which the handle is made of bent wire comprising a cross wire handle formnig portion having two opposed angularly disposed upright sides, the ends of the sides being bent inwardly towards each other and being formed into offset looped hooks, said hooks being in substantial alinement with said uprights and faced upwardly, whereby to engage the opposite faces of said inner side wall panels, the outer ends of the hooks being horizontally extended offset and at opposed right-angles to the lopoed hooks and having their terminals formed into cam-shaped offsets whereby said terminals may be readily inserted into said perforations to mount the handle to said container.

5. In combination, a container comprising a bottom having opposed side and end forming panels thereon, said side panels comprising inner and outer spaced-apart walls and having integral top edges, handle-receiving apertures in said side-forming panels and a single piece wire handle having a handle portion and side panel engaging uprights, said uprights having hooked, panel-engaging ends, said hooked ends having right-angled extensions thereon which engage into said apertures and the under faces of said top edges, said extensions extending in opposite direction from one another.

6. The combination with a container and a handle, as set forth in claim 5, of a cover for said container, the hooked panel-engaging ends of said handle being inwardly offset towards one another and the cover having alined notches in its side edges whereby said notches may engage with the offset portions of said hooked ends thereby to hold said cover in operative position upon said container.

7. The combination with a container and a handle as set forth in claim 5, of a slatted overfill cover for said container, in which the said cover comprises opposed side rails, said rails being connected by cross-slats, the hooked panel-engaging ends of said handle being offset towards one another and alined notches in the rails of said cover whereby the notches in said rails may be engaged with said offset hook ends thereby to temporarily hold said slatted cover in operative position upon said container.

8. The combination with a container and a handle as set forth in claim 5, of an overfill shipping cover for said container, in which the said cover comprises opposed V-shaped side edges, said edges being connected by a cross-panel, the hooked panel-engaging ends of said handle being offset towards one another and alined notches in the under edges of said cover whereby the notches in said side edges may be engaged with said offset hook ends thereby to temporarily hold said cover in operative position upon said container.

9. The combination with a container and a handle as set forth in claim 5, of an overfill shipping cover for said container, in which said cover comprises a blank of corrugated board and is bent at its sides to form longitudinal side edges of triangular form, flaps from said edges being affixed to the under surface of said cover panel, the hooked side panel engaging ends of said handle being offset towards one another and alined slots in the under edges of said cover to removably hold said shipping cover in operative position on said container.

10. A container as set forth in claim 2, in which the outer side forming panels are perforated to receive said handle and in which the handle is made of bent wire comprising a cross wire handle-forming portion having two opposed angularly disposed upright sides, the ends of the sides being bent inwardly towards each other and being formed into offset looped hooks, said hooks being in substantial alinement with said uprights and faced upwardly, whereby to engage the opposite faces of said outer side wall panels, the outer ends of the hooks being horizontally extended offset and at opposed right-angles to the looped hooks and having their terminals formed into cam-shaped offsets whereby said terminals may be readily inserted into said perforations to mount the handle to said container.

11. A container as set forth in claim 5, in which the container is provided with a shipping cover having opposed side notches thereon to engage with the opposed uprights of said handle and a removable double hook-ended strut traversing said cover and engaging the uprights of said handle.

12. The combination with a container as set forth in claim 5, of a shipping cover for said container, said cover comprising a notched cover panel and tuck flaps on opposite ends of said panel.

13. The combination with a container as set forth in claim 5, of a shipping cover for said container comprising a cover panel, tuck flaps on the opposite ends of said panel and hinge-forming score means traversing the cover to form a hinge, by which the ends on opposite sides of the hinge-forming means may be lifted.

14. The combination with a container as set forth in claim 5, of a shipping cover for said container comprising a notched cover panel whereby the cover panel may be fitted to be lockably engaged between the uprights of said handle and a handle-engaging cross strut in contact with said cover, said cover being hinge scored at the point of said contact.

15. In combination, a container comprising a bottom, and side and end forming panels; the side panels comprising inner and outer spaced-apart walls integrally joined at their top margins in a top fold; one of said walls of each side panel having therein an aperture, the upper part of which terminates near but below said top margin; an inverted U-shaped wire handle, the lower part of each arm engaging in one of said apertures; the free end of the handle being disposed above said aperture and between the spaced-apart walls.

16. In combination, a container comprising a bottom, and side and end forming panels; the side panels comprising inner and outer spaced-apart walls integrally joined at their top margins in a top fold; one of said walls of each side panel having therein an aperture, the upper part of which terminates a distance below said top margin; an inverted U-shaped wire handle, the lower part of each arm engaging transversely in one of said apertures; the portion of the arm between the yoke part of the handle and said lower transverse part engaging against one face of the perforated wall and turned partly over said top fold; the free end of the handle being disposed between the spaced-apart walls.

17. In combination, a container comprising a bottom and side and end forming panels; the side panels comprising inner and outer walls integrally joined at their top margins in a top fold; one of said walls of each side panel having therein an aperture below said top margin; an inverted U-shaped wire handle, the lower part of each arm engaging in one of said apertures; the free end part of the handle being turned upwardly and then longitudinally of said fold to form an extension engaging under said top fold.

18. In combination, a container comprising a bottom, and opposed side and end forming panels; the side panels comprising inner and outer spaced-apart walls integrally joined at their top margins in a top fold; one of said walls of each side panel having therein an aperture, the upper part of which terminates a distance below said top margin; an inverted U-shaped wire handle, the lower part of each arm being transverse to the wall and engaging in one of said apertures; the portion of the arm between the yoke part of the handle and said lower transverse part engaging against one face of the perforated wall, and turned over a part of said top fold; the free end of the handle being disposed between the spaced-apart walls and turned longitudinal to said top fold to form an extension engaged under said fold; the part between the extension and said transverse part engaging the other face of the apertured wall.

19. In combination, a container comprising a bottom and side and end forming panels; the side panels comprising inner and outer spaced-apart walls integrally joined at their top margins in a top fold; one of said walls of each side panel having therein an aperture, the upper part of which terminates a distance below said top margin; an inverted U-shaped wire handle, the lower part of each arm engaging in one of said apertures; the free end part of the handle being disposed between the spaced-apart walls, and against said top fold.

20. In combination, a container comprising a bottom and side and end forming panels; the side panels comprising inner and outer walls integrally joined at their top margins in a top fold; one only of said walls of each side panel having therein a single aperture only, below said top margin; an inverted U-shaped wire handle, the lower part of each arm engaging in the single aperture of the associated wall; the free end part of the handle being turned upwardly between adjacent walls.

EARL W. BACKERT.